United States Patent
Ye et al.

(10) Patent No.: US 9,929,936 B2
(45) Date of Patent: Mar. 27, 2018

(54) METHOD FOR SENDING MULTICAST PACKET AND SWITCH

(71) Applicant: Huawei Technologies Co., Ltd., Shenzhen (CN)

(72) Inventors: Chao Ye, Chengdu (CN); Guangrui Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 15/274,527

(22) Filed: Sep. 23, 2016

(65) Prior Publication Data

US 2017/0012859 A1 Jan. 12, 2017

Related U.S. Application Data

(63) Continuation of application No. PCT/CN2014/090962, filed on Nov. 13, 2014.

(30) Foreign Application Priority Data

Mar. 25, 2014 (CN) .......................... 2014 1 0114892

(51) Int. Cl.
*H04L 12/28* (2006.01)
*H04L 12/761* (2013.01)
(Continued)

(52) U.S. Cl.
CPC .......... *H04L 45/16* (2013.01); *H04L 12/6418* (2013.01); *H04L 45/48* (2013.01);
(Continued)

(58) Field of Classification Search
None
See application file for complete search history.

(56) References Cited

U.S. PATENT DOCUMENTS

2007/0133530 A1* 6/2007 Previdi ................. H04L 12/185
370/390
2011/0299528 A1* 12/2011 Yu ....................... H04L 12/1886
370/390

FOREIGN PATENT DOCUMENTS

CN 101102283 A 1/2008
CN 101394342 A 3/2009
(Continued)

OTHER PUBLICATIONS

Partial English Translation and Abstract of Chinese Patent Application No. CN102387079, Mar. 21, 2012, 4 pages.
(Continued)

*Primary Examiner* — Shripal Khajuria
(74) *Attorney, Agent, or Firm* — Conley Rose, P.C.

(57) ABSTRACT

A method for sending a multicast packet and a switch. A first switch receives a multicast packet from a first customer edge or a second customer edge, where the first customer edge is connected to the first switch in a single-homed manner, and the second customer edge is connected, in an all-active manner, to N switches that include the first switch; the first switch determines a specified multicast tree of the first switch; the first switch encapsulate the multicast packet, where a destination switch unique identification address in a header of the encapsulated multicast packet is a unique identification address of a root of the specified multicast tree of the first switch; and the first switch forwards the encapsulated multicast packet to a network side using the specified multicast tree of the first switch.

16 Claims, 3 Drawing Sheets

(51) Int. Cl.
- *H04L 12/64* (2006.01)
- *H04L 12/741* (2013.01)
- *H04L 29/06* (2006.01)
- *H04L 12/721* (2013.01)
- *H04L 12/753* (2013.01)
- *H04L 12/18* (2006.01)
- *H04L 12/931* (2013.01)

(52) U.S. Cl.
CPC .............. *H04L 45/66* (2013.01); *H04L 45/74* (2013.01); *H04L 69/22* (2013.01); *H04L 12/18* (2013.01); *H04L 49/201* (2013.01)

(56) References Cited

FOREIGN PATENT DOCUMENTS

| | | | |
|---|---|---|---|
| CN | 101729274 | A | 6/2010 |
| CN | 101764756 | A | 6/2010 |
| CN | 102387079 | A | 3/2012 |
| CN | 102916888 | A | 2/2013 |
| WO | 2009056023 | A1 | 5/2009 |
| WO | 2011156256 | A1 | 12/2011 |

OTHER PUBLICATIONS

Huawei Tech Co Ltd "Technology White Paper—TRILL," Issue 1, Mar. 31, 2013, http://enterprise.huawei.com, XP055335776, 34 pages.
Foreign Communication From a Counterpart Application, European Application No. 14887370.6, Extended European Search Report dated Jan. 24, 2017, 10 pages.
Foreign Communication From a Counterpart Application, PCT Application No. PCT/CN2014/090962, English Translation of International Search Report dated Jan. 30, 2015, 2 pages.
Foreign Communication From a Counterpart Application, PCT Application No. PCT/CN2014/090962, English Translation of Written Opinion dated Jan. 30, 2015, 9 pages.
Machine Translation and Abstract of Chinese Publication No. CN101102283, Jan. 9, 2008, 17 pages.
Machine Translation and Abstract of Chinese Publication No. CN101394342, Mar. 25, 2009, 20 pages.
Machine Translation and Abstract of Chinese Publication No. CN101729274, Jun. 9, 2010, 18 pages.
Machine Translation and Abstract of Chinese Publication No. CN101764756, Jun. 30, 2010, 29 pages.
Machine Translation and Abstract of International Publication No. WO2009056023, May 7, 2009, 22 pages.
Foreign Communication From a Counterpart Application, Chinese Application No. 201410114892.8, Chinese Office Action dated Oct. 23, 2017, 6 pages.

* cited by examiner

METHOD FOR SENDING MULTICAST PACKET AND SWITCH

CROSS-REFERENCE TO RELATED APPLICATIONS

This application is a continuation of International Application No. PCT/CN2014/090962, filed on Nov. 13, 2014, which claims priority to Chinese Patent Application No. 201410114892.8, filed on Mar. 25, 2014. The disclosures of the aforementioned applications are hereby incorporated by reference in their entireties.

TECHNICAL FIELD

The present disclosure relates to the field of network technologies, and in particular, to a method for sending a multicast packet and a switch.

BACKGROUND

The Transparent Interconnection of Lots of Links (TRILL) is a new protocol used to construct a large-scale Layer 2 network. In a TRILL multi-homing active-active scenario, a customer edge (CE) is connected to two routing bridges (RBs), RB1 and RB2, to perform active-active networking. In this case, a multicast packet sent by the CE may be sent to the RB2 by the RB1 after being encapsulated by the RB1, and then sent to the CE after being decapsulated by the RB2. In this way, the CE receives the packet sent by the CE, which results in cycling of a multicast packet in a network and a waste of network resources. Therefore, it is necessary to avoid this case.

To avoid the foregoing case, a solution of a virtual nickname is used in the prior art. If a CE is connected to two routing bridges, the two routing bridges form an edge group. The routing bridges in the edge group have a common virtual nickname. When the routing bridges in the edge group perform TRILL protocol encapsulation on a multicast packet sent by the CE, a source routing bridge nickname in a TRILL header is the virtual nickname. If a CE is connected to only one routing bridge, when the routing bridge performs TRILL encapsulation on a multicast packet sent by the CE, a source routing bridge nickname in a TRILL header is a real nickname of the routing bridge. As shown in FIG. 1, CE1 is connected to RB1, CE2 is connected to RB1 and RB2, and CE3 is connected to RB2. CE2 sends a multicast packet to RB1. When RB1 performs TRILL encapsulation on the multicast packet, a source routing bridge nickname in a TRILL header is a virtual nickname. After receiving the TRILL encapsulated multicast packet, the RB2 performs determining according to the source routing bridge nickname in the TRILL header of the multicast packet. When determining that the source routing bridge nickname is a virtual nickname, after obtaining the original multicast packet by decapsulating the TRILL encapsulated multicast packet, the RB2 only forwards one copy of the original multicast packet to the CE3 but does not forward it to the CE2, so as to prevent the multicast packet sent by the CE2 from being returned to the CE2.

However, the inventor of this application finds in the research that, it is required in the foregoing solution that an RB can encapsulate different nicknames into a source routing bridge nickname of a TRILL header when the RB performs TRILL encapsulation on a multicast packet based on a source port. This imposes a special requirement on a chip. When there are quite a few dual-homing groups (that is, a case in which one CE is connected to two RBs), an RB is also required to support quite a few nicknames, but it is difficult for a current commercial chip to provide support.

SUMMARY

A technical problem that the present disclosure mainly resolves is to provide a method for sending a multicast packet and a switch, which can implement without using a special chip, a packet sent by a customer edge in an all-active connection is not looped back to the customer edge, thereby avoiding a waste of network resources.

According to a first aspect, the present disclosure provides a method for sending a multicast packet, including: receiving, by a first switch, a multicast packet from a first customer edge or a second customer edge, where the first customer edge is connected to the first switch in a single-homed manner, and the second customer edge is connected, in an all-active manner, to N switches that include the first switch, where N is greater than or equal to 2; determining, by the first switch, a specified multicast tree of the first switch, where the specified multicast tree is specified in advance from N generated multicast trees in a network, and the N switches respectively belong to the N different specified multicast trees; encapsulating, by the first switch, the multicast packet, where a destination switch unique identification address in a header of the encapsulated multicast packet is a unique identification address of a root of the specified multicast tree of the first switch; and forwarding, by the first switch, the encapsulated multicast packet to a network side using the specified multicast tree of the first switch.

According to a second aspect, the present disclosure provides a method for sending a multicast packet, including: receiving, by a first switch, a first multicast packet from a network side; decapsulating, by the first switch, the first multicast packet to obtain a destination switch unique identification address of the first multicast packet from a header of the first multicast packet; determining whether the destination switch unique identification address of the first multicast packet is a unique identification address of a root of a specified multicast tree of the first switch; and if the destination switch unique identification address of the first multicast packet is not the unique identification address of the root of the specified multicast tree of the first switch, sending, by the first switch, the decapsulated first multicast packet to only a single-homed port of all user-side ports of the multicast group in a multicast manner, where all the user-side ports include at least one single-homed port and at least one multi-homed port, a customer edge that is connected to the at least one multi-homed port is connected, in an all-active manner, to N switches that include the first switch, the specified multicast tree of the first switch is specified in advance from N generated multicast trees in a network, and the N switches respectively belong to the N different specified multicast trees, where N is greater than or equal to 2.

According to a third aspect, the present disclosure provides a switch, where the switch includes a receiver, a processor, and a transmitter, where the switch is a first switch; the receiver is configured to receive a multicast packet from a first customer edge or a second customer edge, where the first customer edge is connected to the first switch in a single-homed manner, and the second customer edge is connected, in an all-active manner, to N switches that include the first switch, where N is greater than or equal to 2; the processor is configured to determine a specified multicast tree of the first switch, where the specified multicast tree is specified in advance from N generated multicast trees in a network, and the N switches respectively belong to the N different specified multicast trees; and encapsulate the multicast packet to obtain an encapsulated multicast packet, where a destination switch unique identification address in a header of the encapsulated multicast packet is a unique identification address of a root of the specified multicast tree, determined by the processor, of the first switch; and the transmitter is configured to forward the encapsulated multicast packet to a network side using the specified multicast tree of the first switch.

According to a fourth aspect, the present disclosure provides a switch, where the switch includes a receiver, a processor, and a transmitter, where the switch is a first switch; the receiver is configured to receive a first multicast packet from a network side; the processor is configured to: after the receiver receives the first multicast packet from the network side, decapsulate the first multicast packet to obtain a destination switch unique identification address of the first multicast packet from a header of the first multicast packet; and determine whether the destination switch unique identification address of the first multicast packet decapsulated by processor is a unique identification address of a root of a specified multicast tree of the first switch; and the transmitter is configured to: send the decapsulated first multicast packet to only a single-homed port of all user-side ports of the multicast group in a multicast manner, when the destination switch unique identification address of the first multicast packet is not the unique identification address of the root of the specified multicast tree of the first switch, where all the user-side ports include at least one single-homed port and at least one multi-homed port, a customer edge that is connected to the at least one multi-homed port is connected, in an all-active manner, to N switches that include the first switch, the specified multicast tree of the first switch is specified in advance from N generated multicast trees in a network, and the N switches respectively belong to the N different specified multicast trees, where N is greater than or equal to 2.

One of the beneficial effects of the present disclosure that are different from the prior art are that a second customer edge is connected, in an all-active manner, to N switches that include a first switch. When the first switch encapsulates a multicast packet, a destination switch unique identification address in a header of the multicast packet is a unique identification address of a root of a specified multicast tree of the first switch. After the multicast packet is decapsulated, if the destination switch unique identification address of the multicast packet is the unique identification address of the root of the specified multicast tree of the first switch, the first switch sends the multicast packet to all ports on a user side in a multicast manner. If the destination switch unique identification address of the multicast packet is not the unique identification address of the root of the specified multicast tree of the first switch, the first switch sends the multicast packet to the user side using a single-homed port. In the foregoing manner, according to the present disclosure, it can be implemented without using a special chip that, a multicast packet sent by the second customer edge is not looped back to the second customer edge.

DESCRIPTION OF EMBODIMENTS

In the following, the present disclosure is described in detail with reference to the accompanying drawings and embodiments.

Figure 1:
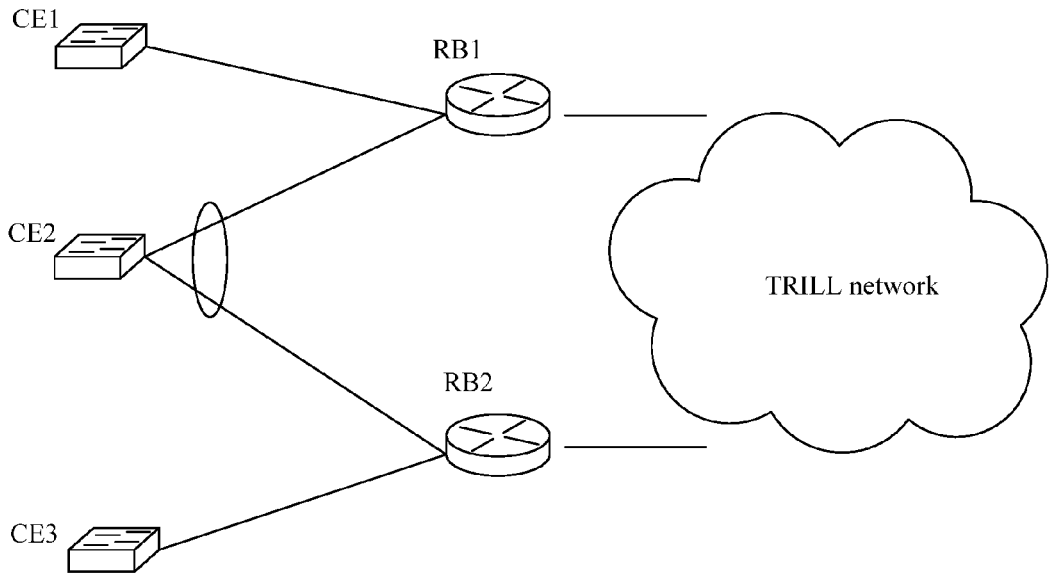
FIG. 1 is a schematic diagram of networking in which a CE is connected to a TRILL network using two active RBs.
Figure 2:
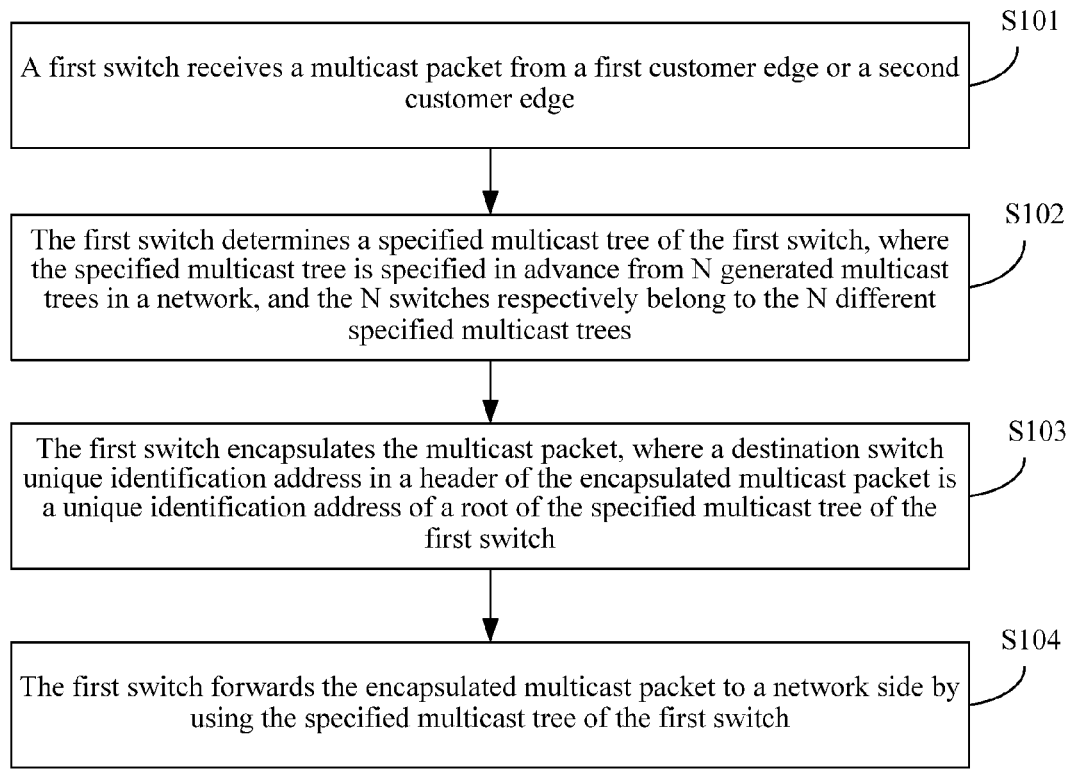
FIG. 2 is a flowchart of an embodiment of a method for sending a multicast packet according to the present disclosure.

Referring to FIG. 2, FIG. 2 is a flowchart of an embodiment of a method for sending a multicast packet according to the present disclosure. The embodiment shows a flowchart of how a first switch encapsulates a packet, including:

Step S101: A first switch receives a multicast packet from a first customer edge or a second customer edge, where the first customer edge is connected to the first switch in a single-homed manner, and the second customer edge is connected, in an all-active manner, to N switches that include the first switch, where N is greater than or equal to 2.

The first customer edge and the second customer edge are network edge devices on a user side, and may be routers, physical switches, or servers. A difference between the first customer edge and the second customer edge is: the first customer edge is connected to only one switch, that is, the first switch. The second customer edge is connected to two or more switches, that is, in addition to the first switch, the second customer edge is further connected to one or more other switches. Moreover, each of the switches connected to the second customer edge can receive a multicast packet sent by the second customer edge. The first switch is an ingress switch running in a large-scale Layer 2 network.

There are two conventional communications modes. One is point-to-point communication between a source host and a destination host, that is, unicast. The other one is point-to-multipoint communication between a source host and all other hosts in a same network segment, that is, broadcast. It is assumed that information is to be sent to multiple hosts rather than all hosts. If the broadcast mode is used, a bandwidth is wasted because the information is sent to a host that does not need the information, and cross-network segment sending cannot be implemented either. If the unicast mode is used, repeated data packets not only occupy a large quantity of bandwidths, but also increase a load of a source host. Therefore, the conventional unicast and broadcast communications modes cannot effectively resolve a problem of single-point transmission and multi-point reception. Multicast refers to that a transmit end sends, in an IP network, a data packet to a determined node set (that is, a multicast group). A basic idea thereof is: a source host (that is, a multicast source) sends only one copy of data, and a destination address of the data is an address of a multicast group; all receivers in the multicast group can receive a same data copy, and moreover, only a host in the multicast group can receive the data while another host cannot receive the data.

The first switch may receive a multicast packet from the first customer edge, or receive a multicast packet from the second customer edge.

Step S102: The first switch determines a specified multicast tree of the first switch, where the specified multicast tree is specified in advance from N generated multicast trees in a network, and the N switches respectively belong to the N different specified multicast trees.

After the large-scale Layer 2 network is established, the entire network selects N roots according to a priority of a unique identification address of a switch and a value of a Media Access Control (MAC) address to generate N multicast trees. N mainly depends on the N switches that the second customer edge is connected to, where N is a natural number greater than or equal to 2. Selecting N roots is to ensure that the N switches are on multicast trees having different roots respectively.

After receiving the multicast packet, the first switch determines the specified multicast tree of the first switch. The specified multicast tree is specified in advance from N generated multicast trees in a network. The N switches respectively belong to the N different specified multicast trees.

Step S102 may be the first switch determines the specified multicast tree of the first switch according to a multicast group identifier carried in the multicast packet and a specified forwarding table preset in the first switch, where an entry of the specified forwarding table includes the multicast group identifier and an identifier of the specified multicast tree.

The multicast group identifier is used to identify a multicast group on the user side. The multicast group identifier may be a virtual local area network (VLAN) identifier or other information that can be used to uniquely identify a multicast group, for example, a VLAN identifier+a multicast group MAC address. Same multicast group identifiers indicate a same multicast group, and different multicast group identifiers indicate different multicast groups. On a TRILL network side, a multicast group is generally identified using a tenant identifier.

The identifier of the specified multicast tree is a unique identification address of a root of the multicast tree.

The entry of the specified forwarding table includes the multicast group identifier and the identifier of the specified multicast tree. According to the multicast group identifier carried in the multicast packet, the identifier, which corresponds to the multicast group identifier, of the specified multicast tree of the first switch can be found in the specified forwarding table preset in the first switch, so that the specified multicast tree of the first switch and the unique identification address of the root of the specified multicast tree can be determined.

The network side is connected to a TRILL network. The unique identification address of the root of the specified multicast tree is a nickname of the root.

The TRILL is a new protocol used to construct a large-scale Layer 2 network, and is also a connection-layer (L2) network standard recommended by the Internet Engineering Task Force (IETF).

Certainly, the network side may also be connected to another large-scale Layer 2 network, for example, a layer 2 virtual private network (L2VPN). This embodiment of the present disclosure may be used for loop breaking at the L2VPN.

Step S103: The first switch encapsulates the multicast packet, where a destination switch unique identification address in a header of the encapsulated multicast packet is a unique identification address of a root of the specified multicast tree of the first switch.

In a TRILL network, the first switch is an RB, and the destination switch unique identification address is a nickname of a root RB. A header of a TRILL packet includes field content such as an outer destination MAC address, an outer source MAC address, a destination switch nickname, and a source switch nickname. In the present disclosure, to encapsulate the multicast packet is to only encapsulate a unique identification address of the root of the specified multicast tree of the first switch. That is, the first switch encapsulates the unique identification address of the root of the specified multicast tree of the first switch as the destination switch unique identification address of the multicast packet.

The N switches that are connected to the second customer edge and that include the first switch respectively belong to different multicast trees. That is, when encapsulating multicast packets, all the N switches connected to the second customer edge only encapsulate unique identification addresses of roots of specified multicast trees of respective switches. Therefore, this helps a decapsulating switch perform identifying and determining when the decapsulating switch forwards a multicast packet, so as not to forward the multicast packet to the second customer edge, thereby preventing the multicast packet from being returned to the second customer edge and achieving an objective of breaking a loop.

Step S104: The first switch forwards the encapsulated multicast packet to a network side using the specified multicast tree of the first switch.

After the multicast packet is encapsulated, the first switch forwards the encapsulated multicast packet to the network side using the specified multicast tree of the first switch.

The forwarding, by the first switch, the encapsulated multicast packet to a network side using the specified multicast tree of the first switch includes: forwarding, by the first switch, the encapsulated multicast packet to the network side using a multicast tree that is obtained by pruning, according to a tenant identifier, the specified multicast tree of the first switch, where the tenant identifier is determined according to the multicast group identifier, and the encapsulated multicast packet further includes the tenant identifier.

On a TRILL network side, a multicast group is generally identified using a tenant identifier. The first switch acquires the tenant identifier using a correspondence between the multicast group identifier and the tenant identifier. The correspondence between the multicast group identifier and the tenant identifier may be configured in the specified forwarding table or an independent table. The tenant identifier may be the same as or different from the multicast group identifier. The tenant identifier is used to identify a forwarded object. It may be learned according to the tenant identifier that a packet of one multicast group needs to be forwarded to which devices and does not need to be forwarded to which devices. When a device corresponding to a tenant identifier is not connected to one switch, if the switch does not need to forward a multicast packet carrying the corresponding tenant identifier, the switch may be deleted from a multicast tree corresponding to the multicast packet.

In other words, it may be pruned. In this way, a waste of network resources can be avoided, and utilization of a network can be improved.

In this embodiment of the present disclosure, a second customer edge is connected, in an all-active manner, to N switches that include a first switch, and when the first switch encapsulates a multicast packet, a destination switch unique identification address in a header of the multicast packet is a unique identification address of a root of a specified multicast tree of the first switch. In this way, it can be implemented without using a special chip that, a multicast packet sent by a customer edge in an all-active connection is not looped back to the customer edge.

Figure 3:
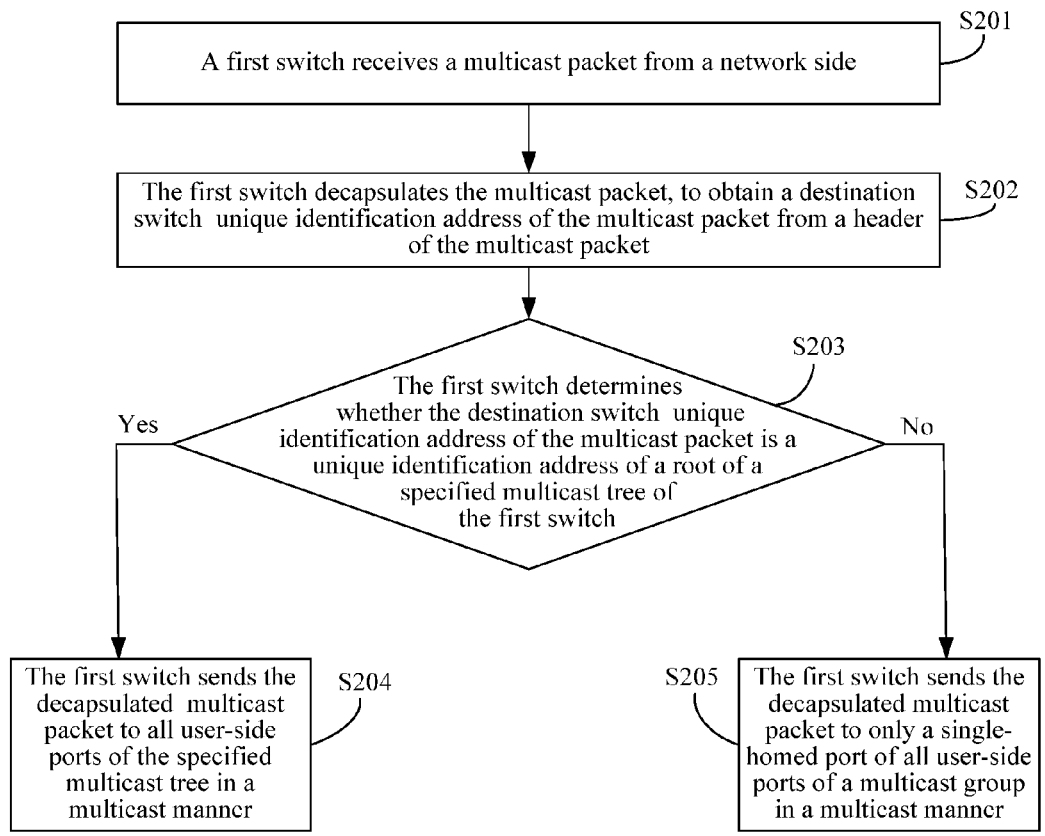
FIG. 3 is a flowchart of another embodiment of a method for sending a multicast packet according to the present disclosure.

Referring to FIG. 3, FIG. 3 is a flowchart of another embodiment of a method for sending a multicast packet according to the present disclosure. The embodiment shows a flowchart of how a first switch decapsulates a multicast packet, including:

Step S201: A first switch receives a multicast packet from a network side.

The first switch is a switch running in a large-scale Layer 2 network. The multicast packet is a first multicast packet or a second multicast packet. The first multicast packet is from a customer edge that is connected to switches in an all-active manner. The second multicast packet is from a customer edge that is connected to a switch in a single-homed manner. The first multicast packet and the second multicast packet belong to a same multicast group. Sending a packet in a same multicast group using multiple multicast trees not only can implement load balancing but also can achieve an objective of breaking a loop in the present disclosure.

The network side is connected to a TRILL network. Certainly, the network side may also be connected to another large-scale Layer 2 network, for example, a connection layer of a virtual private network L2VPN. The embodiment of the present disclosure may be used for loop breaking at the L2VPN.

Step S202: The first switch decapsulates the multicast packet to obtain a destination switch unique identification address of the multicast packet from a header of the multicast packet.

Decapsulating, by the first switch, the multicast packet from the network side is a basic function of the first switch. Regardless of which multicast tree on the network side the multicast packet comes from, the first switch decapsulates the multicast packet.

Step S203: The first switch determines whether the destination switch unique identification address of the multicast packet is a unique identification address of a root of a specified multicast tree of the first switch. If yes, proceed to step S204; or if not, proceed to step S205.

It is determined whether the destination switch unique identification address of the multicast packet is the unique identification address of the root of the specified multicast tree of the first switch, so that the first switch determines a policy of sending the multicast packet.

Step S203 may be:

A. A multicast group identifier of the multicast packet is acquired according to a tenant identifier of the multicast packet.

The first switch acquires a corresponding multicast group identifier according to the tenant identifier of the multicast packet on the network side and a preset correspondence between a multicast group identifier and a tenant identifier.

B. A specified forwarding table preset in the first switch is searched according to the multicast group identifier of the multicast packet and the destination switch unique identification address.

An entry of the specified forwarding table includes the multicast group identifier and an identifier of the specified multicast tree. The first switch finds the identifier, which corresponds to the multicast group identifier, of the specified multicast tree of the first switch according to the specified forwarding table preset in the first switch. The identifier of the specified multicast tree is a unique identification address of a root of the multicast tree, so that the specified multicast tree of the first switch and the unique identification address of the root of the specified multicast tree can be determined. The correspondence between the multicast group identifier and the tenant identifier may be configured in the specified forwarding table or an independent table.

C. When an entry including a multicast group identifier and a destination switch unique identification address of a multicast packet is found, it is determined that the destination switch unique identification address of the multicast packet is the unique identification address of the root of the specified multicast tree of the first switch; and otherwise, it is determined that the destination switch unique identification address of the multicast packet is not the unique identification address of the root of the specified multicast tree of the first switch.

Step S204: If the destination switch unique identification address of the multicast packet is the unique identification address of the root of the specified multicast tree of the first switch, the first switch sends the decapsulated multicast packet to all user-side ports of the specified multicast tree in a multicast manner. All the user-side ports include at least one single-homed port and at least one multi-homed port. A customer edge that is connected to the at least one multi-homed port is connected, in an all-active manner, to the N switches that include the first switch. The specified multicast tree of the first switch is specified in advance from N generated multicast trees in a network, and the N switches respectively belong to the N different specified multicast trees, where N is greater than or equal to 2. The decapsulated multicast packet includes the multicast group identifier.

Customer edges that are connected to the first switch generally include two types of customer edges. One is a first customer edge, where the first customer edge is connected to only the first switch. The other one is a second customer edge, where the second customer edge, in addition to being connected to the first switch, is further connected to at least one switch except the first switch. That is, the second customer edge is connected to N switches, where N is a natural number greater than or equal to 2. The N switches respectively belong to different multicast trees on the network side. In this way, a multicast packet sent by the second customer edge can be prevented from being returned to the second customer edge.

Ports on a user side include two types of ports. One type of port is a single-homed port (Ports on an RB that are connected to a single-homed device), and the other type of port is a multi-homed port (Ports on an RB that are connected to a multi-homed device). A customer edge that is connected to at least one multi-homed port is connected, in an all-active manner, to the N switches that include the first switch. The first customer edge is connected to the first switch using the single-homed port. The second customer edge is connected to the first switch using the multi-homed port.

If the destination switch unique identification address of the multicast packet is the unique identification address of the root of the specified multicast tree of the first switch, the multicast packet is the second multicast packet. The first switch sends the decapsulated second multicast packet to all user-side ports (that is, a single-homed port and a multi-homed port) of the specified multicast tree in a multicast manner.

Step S205: If the destination switch unique identification address of the multicast packet is not the unique identification address of the root of the specified multicast tree of the first switch, the first switch sends the decapsulated multicast packet to only a single-homed port of all user-side ports of a multicast group in a multicast manner.

If the destination switch unique identification address of the multicast packet is not the unique identification address of the root of the specified multicast tree of the first switch, the multicast packet is the first multicast packet, which indicates that both a switch that encapsulates the multicast packet and the first switch are connected to the second customer edge. The multicast packet is sent by the second customer edge. The destination switch unique identification address of the multicast packet is not the unique identification address of the root of the specified multicast tree of the first switch. Obviously, the second customer edge does not intend that the multicast packet is returned to the second customer edge. Therefore, the first switch sends, in a multicast manner, the multicast packet using the single-homed port on the user side, which can prevent the multicast packet from being returned to the second customer edge.

In this embodiment of the present disclosure, a second customer edge is connected, in an all-active manner, to N switches that include a first switch. If a destination switch unique identification address of a multicast packet is a unique identification address of a root of a specified multicast tree of the first switch, the first switch sends the multicast packet to all ports on a user side in a multicast manner. If a destination switch unique identification address of a multicast packet is not a unique identification address of a root of a specified multicast tree of the first switch, the first switch sends the multicast packet to a user side using a single-homed port. In this way, it can be implemented without using a special chip that, a multicast packet sent by the second customer edge is not looped back to the second customer edge.

It should be noted that, the foregoing processes in which a first switch encapsulates a multicast packet and decapsulates a multicast packet are described separately. In actual application, the two processes may be combined in execution, and details are not described herein again.

Figure 4:
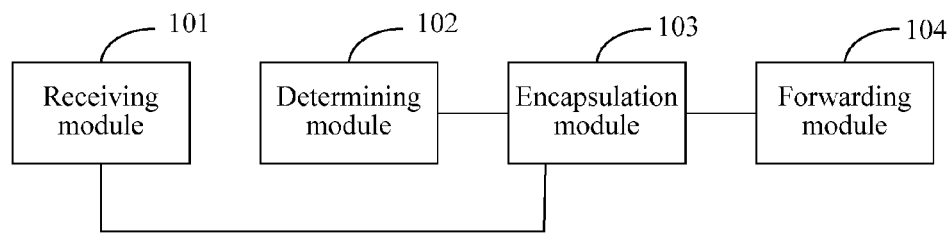
FIG. 4 is a schematic structural diagram of an embodiment of a first switch according to the present disclosure.

Referring to FIG. 4, FIG. 4 is a schematic structural diagram of an embodiment of a first switch according to the present disclosure. The first switch is a switch encapsulating a multicast packet and includes a receiving module 101, a determining module 102, an encapsulation module 103, and a forwarding module 104.

The receiving module 101 is configured to receive a multicast packet from a first customer edge or a second customer edge, where the first customer edge is connected to the first switch in a single-homed manner, and the second customer edge is connected, in an all-active manner, to N switches that include the first switch, where N is greater than or equal to 2.

The first customer edge and the second customer edge are network edge devices on a user side. A difference between the first customer edge and the second customer edge is: the first customer edge is connected to only one switch, that is, the first switch; the second customer edge is connected to two or more switches, that is, in addition to the first switch, the second customer edge is further connected to one or more other switches. Moreover, each of the switches connected to the second customer edge can receive a multicast packet sent by the second customer edge. The first switch is an ingress switch running in a large-scale Layer 2 network.

Multicast refers to that a transmit end sends, in an IP network, a data packet to a determined node set (that is, a multicast group). A basic idea thereof is: a source host (that is, a multicast source) sends only one copy of data, and a destination address of the data is an address of a multicast group; all receivers in the multicast group can receive a same data copy, and moreover, only a host in the multicast group can receive the data while another host cannot receive the data.

The first switch may receive a multicast packet from the first customer edge, or receive a multicast packet from the second customer edge.

The determining module 102 is configured to determine a specified multicast tree of the first switch after the receiving module 101 receives the multicast packet from the first customer edge or the second customer edge, where the specified multicast tree is specified in advance from N generated multicast trees in a network, and the N switches respectively belong to the N different specified multicast trees.

After the large-scale Layer 2 network is established, the entire network selects N roots according to a priority of a unique identification address of a switch and a value of a Media Access Control MAC address to generate N multicast trees. N mainly depends on the N switches that the second customer edge is connected to, where N is a natural number greater than or equal to 2. Selecting N roots is to ensure that the N switches are on multicast trees having different roots respectively.

After receiving the multicast packet, the first switch determines the specified multicast tree of the first switch. The specified multicast tree is specified in advance from N generated multicast trees in a network, and the N switches respectively belong to the N different specified multicast trees.

The network side is connected to a TRILL network, and a unique identification address of a root of the specified multicast tree is a nickname of the root.

The TRILL is a new protocol used to construct a large-scale Layer 2 network, and is also an L2 network standard recommended by the IETF. Certainly, the network side may also be connected to another large-scale Layer 2 network, for example, a connection layer of a virtual private network L2VPN. This embodiment of the present disclosure may be used for loop breaking at the L2VPN.

The determining module 102 is configured to determine the specified multicast tree of the first switch according to a multicast group identifier carried in the multicast packet and a specified forwarding table preset in the first switch, where an entry of the specified forwarding table includes the multicast group identifier and an identifier of the specified multicast tree.

The multicast group identifier is used to identify a multicast group on the user side. The multicast group identifier may be a VLAN identifier or other information that can uniquely identify a multicast group. Same multicast group identifiers indicate a same multicast group, and different multicast group identifiers indicate different multicast groups. On a TRILL network side, a multicast group is generally identified using a tenant identifier.

The identifier of the specified multicast tree is a unique identification address of a root of the multicast tree.

The entry of the specified forwarding table includes the multicast group identifier and the identifier of the specified multicast tree. According to the multicast group identifier carried in the multicast packet, the identifier, which corresponds to the multicast group identifier, of the specified multicast tree of the first switch can be found in the specified forwarding table preset in the first switch, so that the specified multicast tree of the first switch and the unique identification address of the root of the specified multicast tree can be determined.

The encapsulation module 103 is configured to encapsulate the multicast packet, where a destination switch unique identification address in a header of the encapsulated multicast packet is a unique identification address of a root of the specified multicast tree, determined by the determining module 102, of the first switch.

In a TRILL network, the first switch is an RB, and the destination switch unique identification address is a nickname of a root RB. A header of a TRILL multicast packet includes field content such as an outer destination MAC address, an outer source MAC address, a destination switch nickname, and a source switch nickname. In the present disclosure, to encapsulate the multicast packet is to only encapsulate the unique identification address of the root of the specified multicast tree of the first switch. That is, the first switch encapsulates the unique identification address of the root of the specified multicast tree of the first switch as a destination switch unique identification address of the multicast packet.

The N switches that are connected to the second customer edge in an all-active manner and that include the first switch respectively belong to different specified multicast trees. That is, when encapsulating multicast packets, all the N switches connected to the second customer edge only encapsulate the multicast packets to unique identification addresses of roots of specified multicast trees of respective switches. Therefore, this helps a decapsulating switch perform identifying and determining when the decapsulating switch forwards a multicast packet, so as not to forward the multicast packet to the second customer edge, thereby preventing the multicast packet from being returned to the second customer edge and achieving an objective of breaking a loop.

The forwarding module 104 is configured to forward the multicast packet encapsulated by the encapsulation module 103 to a network side using the specified multicast tree of the first switch.

After the multicast packet is encapsulated, the first switch forwards the encapsulated multicast packet to the network side using the specified multicast tree of the first switch.

The forwarding module 104 is configured to forward the encapsulated multicast packet to the network side using a multicast tree that is obtained by pruning, according to a tenant identifier, the specified multicast tree of the first switch, where the tenant identifier is determined according to the multicast group identifier, and the encapsulated multicast packet further includes the tenant identifier.

On a TRILL network side, a multicast group is generally identified using a tenant identifier. The tenant identifier is used to identify a forwarded object. It may be learned, according to the tenant identifier, that a packet of one multicast group needs to be forwarded to which devices and does not need to be forwarded to which devices. When a device corresponding to a tenant identifier is not connected to one switch, if the switch does not need to forward a multicast packet carrying the corresponding tenant identifier, the switch may be deleted from a multicast tree corresponding to the multicast packet. In other words, it may be pruned. In this way, a waste of network resources can be avoided, and utilization of a network can be improved.

In this embodiment of the present disclosure, a second customer edge is connected, in an all-active manner, to N switches that include a first switch, and when the first switch encapsulates a multicast packet, a destination switch unique identification address in a header of the multicast packet is a unique identification address of a root of a specified multicast tree of the first switch. In this way, it can be implemented without using a special chip that, a multicast packet sent by a customer edge in an all-active connection is not looped back to the customer edge.

Figure 5:
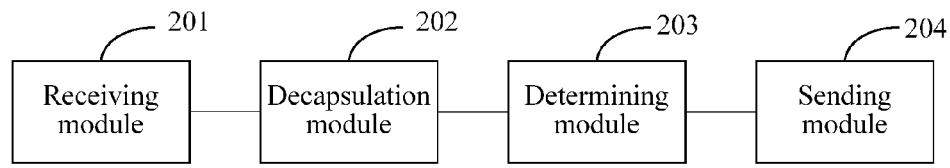
FIG. 5 is a schematic structural diagram of another embodiment of a first switch according to the present disclosure.

Referring to FIG. 5, FIG. 5 is a schematic structural diagram of another embodiment of a first switch according to the present disclosure. The first switch in this embodiment is a switch decapsulating a multicast packet and includes a receiving module 201, a decapsulation module 202, a determining module 203, and a sending module 204.

The receiving module 201 is configured to receive a multicast packet from a network side, where the multicast packet may be a first multicast packet or a second multicast packet, and the second multicast packet and the first multicast packet belong to a same multicast group.

The first multicast packet is from a customer edge that is connected to switches in an all-active manner, and the second multicast packet is from a customer edge that is connected to a switch in a single-homed manner. The first multicast packet and the second multicast packet belong to a same multicast group. Sending a packet in a same multicast group using multiple trees not only can implement load balancing but also can achieve an objective of breaking a loop in the present disclosure.

The network side is connected to a TRILL network. Certainly, the network side may also be connected to another large-scale Layer 2 network, for example, a connection layer of a virtual private network L2VPN. The embodiment of the present disclosure may be used for loop breaking at the L2VPN.

The decapsulation module 202 is configured to: after the receiving module 201 receives the multicast packet from the network side, decapsulate the multicast packet to obtain a destination switch unique identification address of the multicast packet from a header of the multicast packet.

Decapsulating the multicast packet from the network side is a basic function of the first switch. Regardless of which multicast tree on the network side the multicast packet comes from, the decapsulation module 202 of the first switch decapsulates the multicast packet.

The determining module 203 is configured to determine whether the destination switch unique identification address of the multicast packet decapsulated by the decapsulation module 202 is a unique identification address of a root of a specified multicast tree of the first switch.

It is determined whether the destination switch unique identification address of the multicast packet is the unique identification address of the root of the specified multicast tree of the first switch, so that the first switch determines a policy of sending the multicast packet to different customer edges.

The determining module 203 includes an acquiring unit, a searching unit, and a determining unit.

The acquiring unit is configured to acquire a multicast group identifier of the multicast packet according to a tenant identifier of the multicast packet.

The first switch acquires a corresponding multicast group identifier according to the tenant identifier of the multicast packet on the network side and a preset correspondence between a multicast group identifier and a tenant identifier.

The searching unit is configured to search, according to the multicast group identifier, which is obtained by the acquiring unit, of the multicast packet and the destination switch unique identification address, a specified forwarding table preset in the first switch.

An entry of the specified forwarding table includes the multicast group identifier and an identifier of the specified multicast tree. The first switch finds the identifier, which corresponds to the multicast group identifier, of the specified multicast tree of the first switch according to the specified forwarding table preset in the first switch. The identifier of the specified multicast tree is a unique identification address of a root of the multicast tree, so that the specified multicast tree of the first switch and the unique identification address of the root of the specified multicast tree can be determined. The correspondence between the multicast group identifier and the tenant identifier may be configured in the specified forwarding table or an independent table.

The determining unit is configured to: when the searching unit finds an entry including the multicast group identifier and the destination switch unique identification address of the multicast packet, determine that the destination switch unique identification address of the multicast packet is the unique identification address of the root of the specified multicast tree of the first switch; and otherwise, determine that the destination switch unique identification address of the multicast packet is not the unique identification address of the root of the specified multicast tree of the first switch.

The sending module 204 is configured to: when a determining result of the determining module 203 is that the destination switch unique identification address of the multicast packet is not the unique identification address of the root of the specified multicast tree of the first switch, send the decapsulated multicast packet to only a single-homed port of all user-side ports of the multicast group in a multicast manner, where all the user-side ports include at least one single-homed port and at least one multi-homed port, a customer edge that is connected to the at least one multi-homed port is connected, in an all-active manner, to N switches that include the first switch, the specified multicast tree of the first switch is specified in advance from N generated multicast trees in a network, and the N switches respectively belong to the N different specified multicast trees, where N is greater than or equal to 2, and the decapsulated multicast packet includes the multicast group identifier.

Customer edges that are connected to the first switch generally include two types of customer edges. One is a first customer edge, where the first customer edge is connected to only the first switch. The other one is a second customer edge, where the second customer edge, in addition to being connected to the first switch, is further connected to at least one switch except the first switch. That is, the second customer edge is connected to N switches, where N is a natural number greater than or equal to 2. The N switches respectively belong to different specified multicast trees on the network side. In this way, a multicast packet sent by the second customer edge can be prevented from being returned to the second customer edge.

All ports of the first switch include two types of ports. One type of port is a single-homed port, and the other type of port is a multi-homed port. A customer edge that is connected to at least one multi-homed port is connected, in an all-active manner, to the N switches that include the first switch. The first customer edge is connected to the first switch using the single-homed port. The second customer edge is connected to the first switch using the multi-homed port.

If the destination switch unique identification address of the multicast packet is not the unique identification address of the root of the specified multicast tree of the first switch, the multicast packet is the first multicast packet, which indicates that both a switch that encapsulates the multicast packet and the first switch are connected to the second customer edge. The multicast packet is sent by the second customer edge. The destination switch unique identification address of the multicast packet is not the unique identification address of the root of the specified multicast tree of the first switch. Obviously, the second customer edge does not intend that the multicast packet is returned to the second customer edge. Therefore, the first switch sends, in a multicast manner, the multicast packet using the single-homed port of the first switch to the user side, which can prevent the multicast packet from being returned to the second customer edge.

The sending module 204 is further configured to: when a determining result of the determining module 203 is that the destination switch unique identification address of the multicast packet is the unique identification address of the root of the specified multicast tree of the first switch, send the decapsulated multicast packet to all user-side ports of the specified multicast tree in a multicast manner.

If the destination switch unique identification address of the multicast packet is the unique identification address of the root of the specified multicast tree of the first switch, the multicast packet is the second multicast packet. The first switch sends the decapsulated second multicast packet to all user-side ports (that is, a single-homed port and a multi-homed port) of the specified multicast tree in a multicast manner.

In this embodiment of the present disclosure, a second customer edge is connected, in an all-active manner, to N switches that include a first switch. If a destination switch unique identification address of a multicast packet is a unique identification address of a root of a specified multicast tree of the first switch, the first switch sends the multicast packet to all ports on a user side in a multicast manner. If a destination switch unique identification address of a multicast packet is not a unique identification address of a root of a specified multicast tree of the first switch, the first switch sends the multicast packet to a first customer edge using a single-homed port. In this way, it can be implemented without using a special chip that, a multicast packet sent by the second customer edge is not looped back to the second customer edge.

It should be noted that, the foregoing first switch encapsulating a multicast packet and the foregoing first switch decapsulating a multicast packet are described separately. In actual application, the two first switches may be also combined into one switch, and details are not described herein again.

The following describes application of the present disclosure in a TRILL network with a specific embodiment.

Figure 6:
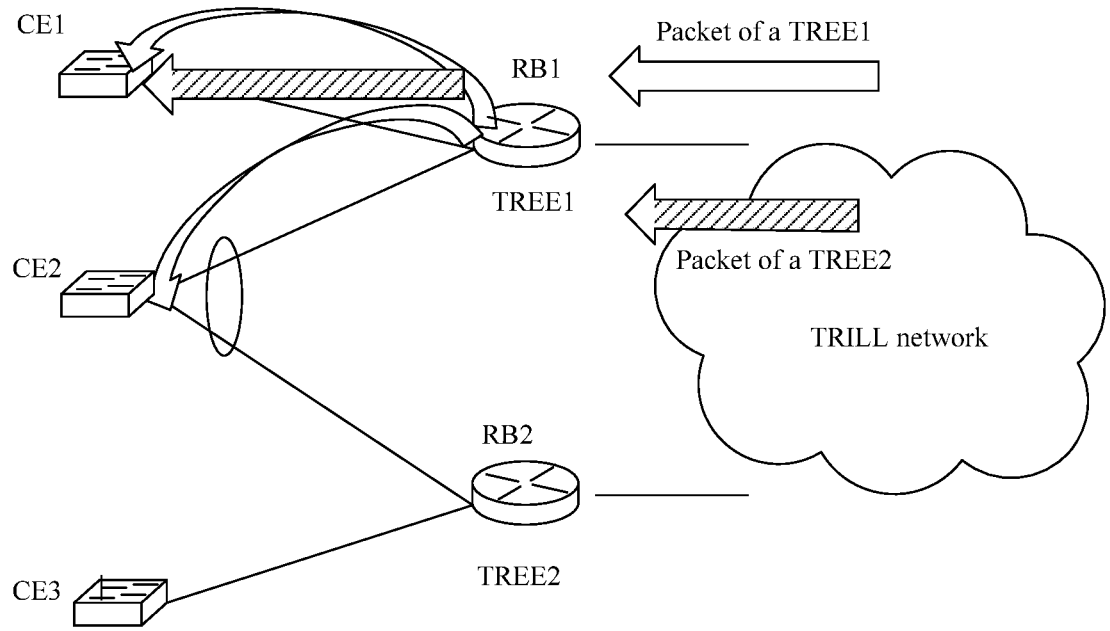
FIG. 6 is a schematic diagram of different sending strategies determined when an RB1 in FIG. 1 decapsulates different packets.

Referring to FIG. 6, a CE1 (that is, a first customer edge) is connected to an RB1 (that is, a first switch) using a single-homed port. A CE2 (that is, a second customer edge) is connected to the RB1 and an RB2 (another switch, that is, another first switch) using a multi-homed port. A CE3 (that is, a first customer edge) is connected to the RB2 using a single-homed port. A specified multicast tree of the RB1 is a TREE1, and a specified multicast tree of the RB2 is a TREE2. In this embodiment, encapsulating and decapsulating processes are combined for description. Specific content is as follows:

1. The RB1 encapsulates only a nickname of a root of the multicast tree TREE1 as a destination switch unique identification address in a header of a multicast packet. The RB2 encapsulates only a nickname of a root of the multicast tree TREE2 as a destination switch unique identification address in a header of a multicast packet.

After a TRILL network is established, according to a priority of a nickname of a root of a multicast tree and a value of a MAC address, two roots are selected to generate two multicast trees. Next, two pruned trees are generated after multicast pruning is performed. For a multicast packet of a customer edge connected to the RB1, the RB1 encapsulates a nickname of a root of the multicast tree TREE1 as a destination switch unique identification address in a header of the multicast packet and performs forwarding according to a pruned multicast tree TREE1. Similarly, for a multicast packet of a customer edge connected to the RB2, the RB2 encapsulates a nickname of a root of the multicast tree TREE2 as a destination switch unique identification address in a header of the multicast packet and performs forwarding according to a pruned multicast tree TREE2.

2. The RB1 and the RB2 may both decapsulate the multicast packet of the multicast tree TREE1 (that is, a destination switch unique identification address in a header of the multicast packet is the nickname of the root of the TREE1) and the multicast packet of the multicast tree TREE2 (that is, a destination switch unique identification address in a header of the multicast packet is the nickname of the root of the TREE2) that are sent from a network side.

3. The multicast packet, decapsulated by the RB1, of the multicast tree TREE1 (that is, the destination switch unique identification address in the header of the multicast packet is the nickname of the root of the TREE1) is sent to all ports (a single-homed port and a multi-homed port), for example, sent to both the CE1 and the CE2. The multicast packet, decapsulated by the RB1, of the multicast tree TREE2 (that is, the destination switch unique identification address in the header of the multicast packet is the nickname of the root of the TREE2) is sent to only the single-homed port but not sent to the multi-homed port, for example, sent to the CE1 but not sent to the CE2, as shown in FIG. 6.

4. The multicast packet, decapsulated by the RB2, of the multicast tree TREE1 is sent to only the single-homed port but not sent to the multi-homed port, for example, sent to the CE3 but not sent to the CE2. The multicast packet, decapsulated by the RB2, of the multicast tree TREE2 is sent to all the ports, for example, sent to both the CE3 and the CE2.

5. Because the RB1 always encapsulates the nickname of the root of the multicast tree TREE1 as the destination switch unique identification address of the multicast packet, and the RB2 always encapsulates the nickname of the root of the multicast tree TREE2 as the destination switch unique identification address of the multicast packet, there is no need to worry that the multicast packet that is sent from the CE2 to the RB1 is returned to the CE2 via the RB2.

Figure 7:
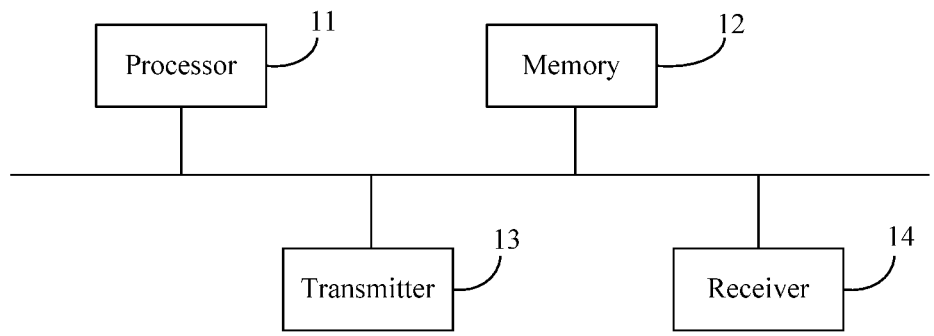
FIG. 7 is a schematic diagram of an entity structure of still another embodiment of a first switch according to the present disclosure.

Referring to FIG. 7, FIG. 7 is a schematic diagram of an entity structure of still another embodiment of a first switch according to the present disclosure. The first switch in this embodiment is a switch encapsulating a multicast packet and includes a processor 11, and a memory 12, a transmitter 13 and a receiver 14 that are coupled to the processor 11.

The receiver 14 is configured to receive a multicast packet from a first customer edge or a second customer edge, and store the received multicast packet in the memory 12, where the first customer edge is connected to the first switch in a single-homed manner, and the second customer edge is connected, in an all-active manner, to N switches that include the first switch, where N is greater than or equal to 2.

The memory 12 is configured to store a generated multicast tree that is on a network side.

The processor 11 is configured to retrieve the generated multicast tree that is on the network side and that is stored in the memory 12 and determine a specified multicast tree of the first switch, where the specified multicast tree is specified in advance from N generated multicast trees in a network, and the N switches respectively belong to the N different specified multicast trees.

The processor 11 is configured to retrieve a multicast packet stored in the memory 12, and encapsulate the multicast packet, where a destination switch unique identification address in a header of the encapsulated multicast packet is a unique identification address of a root of the specified multicast tree of the first switch.

The processor 11 is configured to control the transmitter 13 to forward, using the specified multicast tree of the first switch, the encapsulated multicast packet to the network side.

The network side is connected to a TRILL network.

The processor 11 is further configured to determine the specified multicast tree of the first switch according to a multicast group identifier carried in the multicast packet and a specified forwarding table preset in the first switch, where an entry of the specified forwarding table includes the multicast group identifier and an identifier of the specified multicast tree.

The processor 11 is further configured to control the transmitter 13 to forward, using a multicast tree that is obtained by pruning, according to a tenant identifier, the specified multicast tree of the first switch, the encapsulated multicast packet to the network side, where the tenant identifier is determined according to the multicast group identifier, and the encapsulated multicast packet further includes the tenant identifier.

In this embodiment of the present disclosure, a second customer edge is connected, in an all-active manner, to N switches that include a first switch. When the first switch encapsulates a multicast packet, a destination switch unique identification address in a header of the multicast packet is a unique identification address of a root of a specified multicast tree of the first switch. In this way, it can be implemented without using a special chip that, a multicast packet sent by the second customer edge is not looped back to the second customer edge.

Figure 8:
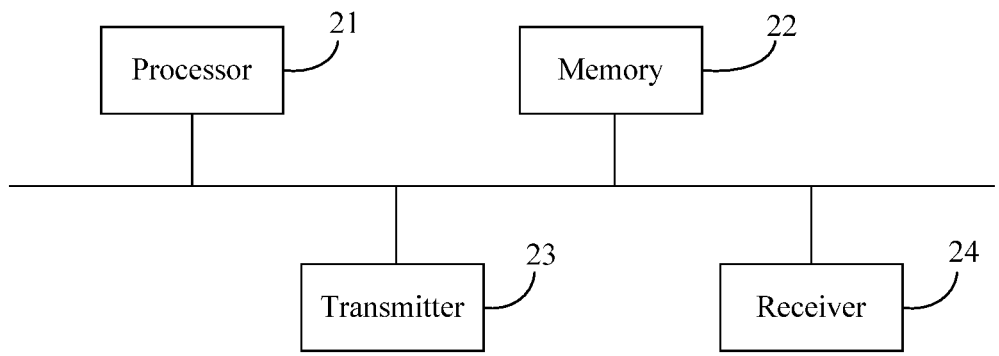
FIG. 8 is a schematic diagram of an entity structure of still another embodiment of a first switch according to the present disclosure.

Referring to FIG. 8, FIG. 8 is a schematic diagram of an entity structure of still another embodiment of a first switch according to the present disclosure. The first switch in this embodiment is a switch decapsulating a multicast packet and includes a processor 21, and a memory 22, a transmitter 23 and a receiver 24 that are coupled to the processor 21.

The receiver 24 is configured to receive a multicast packet from a network side, and store the received multicast packet in the memory 22, where the multicast packet may be a first multicast packet or a second multicast packet, and the second multicast packet and the first multicast packet belong to a same multicast group. The first multicast packet is from a customer edge that is connected to switches in an all-active manner, and the second multicast packet is from a customer edge that is connected to a switch in a single-homed manner. The first multicast packet and the second multicast packet belong to a same multicast group. Sending a packet in a same multicast group using two trees not only can implement load balancing but also can achieve an objective of breaking a loop in the present disclosure.

The processor 21 is configured to retrieve the multicast packet stored in the memory 22, and decapsulate the multicast packet to obtain a destination switch unique identification address of the multicast packet from a header of the multicast packet.

The processor 21 is configured to determine whether the destination switch unique identification address of the multicast packet is a unique identification address of a root of the specified multicast tree of the first switch. If the destination switch unique identification address of the multicast packet is the unique identification address of the root of the specified multicast tree of the first switch, the processor 21 controls the transmitter 23 to send the decapsulated multicast packet to all user-side ports of the specified multicast tree in a multicast manner, where all the user-side ports include at least one single-homed port and at least one multi-homed port; a customer edge connecting to a multi-homed port is connected, in an all-active manner, to N switches that include the first switch, the specified multicast tree of the first switch is specified in advance from N generated multicast trees in a network, and the N switches respectively belong to the N different specified multicast trees, where N is greater than or equal to 2. If the destination switch unique identification address of the multicast packet is not a unique identification address of a root of the specified multicast tree of the first switch, the processor 21 controls the transmitter 23 to send the decapsulated multicast packet to only a single-homed port of all user-side ports of a multicast group in a multicast manner.

The network side is connected to a TRILL network.

In this embodiment of the present disclosure, a second customer edge is connected, in an all-active manner, to N switches that include a first switch. If a destination switch unique identification address of a multicast packet is a unique identification address of a root of a specified multicast tree of the first switch, the first switch sends the multicast packet to all ports on a user side in a multicast manner. If a destination switch unique identification address of a multicast packet is not a unique identification address of a root of a specified multicast tree of the first switch, the first switch sends the multicast packet to a user side using a single-homed port. In this way, it can be implemented without using a special chip that, a multicast packet sent by the second customer edge is not looped back to the second customer edge.

The foregoing descriptions are merely embodiments of the present disclosure, and are not intended to limit the scope of the present disclosure. An equivalent structural or equivalent process alternation made using the content of the specification and drawings of the present disclosure, or an application of the content of the specification and drawings directly or indirectly to another related technical field, shall fall within the protection scope of the present disclosure.

What is claimed is:

1. A method for sending a multicast packet, comprising:
receiving, by a first switch, a multicast packet from a first customer edge or a second customer edge, wherein the first customer edge is connected to the first switch in a single-homed manner, wherein the second customer edge is connected to N switches in an all-active manner, wherein the N switches comprise the first switch, and wherein N is greater than or equal to 2;
determining, by the first switch, a specified multicast tree of the first switch, wherein the specified multicast tree is specified in advance from N generated multicast trees in a network, and wherein the N switches respectively belong to the N different specified multicast trees;
encapsulating, by the first switch, the multicast packet to obtain an encapsulated multicast packet, wherein a destination switch unique identification address in a header of the encapsulated multicast packet is a unique identification address of a root of the specified multicast tree of the first switch; and
forwarding, by the first switch, the encapsulated multicast packet to a network side using the specified multicast tree of the first switch.

2. The method according to claim 1, wherein the network side is connected to a Transparent Interconnection of Lots of Links (TRILL) network, and wherein the unique identification address of the root of the specified multicast tree is a nickname of the root.

3. The method according to claim 1, wherein determining the specified multicast tree of the first switch comprises determining, by the first switch, the specified multicast tree of the first switch according to a multicast group identifier carried in the multicast packet and a specified forwarding table preset in the first switch, wherein an entry of the specified forwarding table comprises the multicast group identifier and an identifier of the specified multicast tree, wherein forwarding, by the first switch, the encapsulated multicast packet to the network side using the specified multicast tree of the first switch comprises forwarding, by the first switch, the encapsulated multicast packet to the network side using a multicast tree that is obtained by pruning, according to a tenant identifier, the specified multicast tree of the first switch, wherein the tenant identifier is determined according to the multicast group identifier, and wherein the encapsulated multicast packet further comprises the tenant identifier.

4. A method for sending a multicast packet, comprising:
receiving, by a first switch, a first multicast packet from a network side;
decapsulating, by the first switch, the first multicast packet to obtain a destination switch unique identification address of the first multicast packet from a header of the first multicast packet;
determining whether the destination switch unique identification address of the first multicast packet is a unique identification address of a root of a specified multicast tree of the first switch; and
sending, by the first switch, the decapsulated first multicast packet to only a single-homed port of all user-side ports of a multicast group in a multicast manner when the destination switch unique identification address of the first multicast packet is not the unique identification address of the root of the specified multicast tree of the first switch,
wherein all the user-side ports comprise at least one single-homed port and at least one multi-homed port,
wherein a customer edge that is connected to the at least one multi-homed port is connected, in an all-active manner, to N switches,
wherein the N switches comprise the first switch,
wherein the specified multicast tree of the first switch is specified in advance from N generated multicast trees in a network,
wherein the N switches respectively belong to the N different specified multicast trees, and
wherein N is greater than or equal to 2.

5. The method according to claim 4, wherein the method further comprises:

receiving, by the first switch, a second multicast packet from the network side, wherein the second multicast packet and the first multicast packet belong to a same multicast group;

decapsulating, by the first switch, the second multicast packet to obtain a destination switch unique identification address of the second multicast packet from a header of the second multicast packet;

determining whether the destination switch unique identification address of the second multicast packet is the unique identification address of the root of the specified multicast tree of the first switch; and sending, by the first switch, the decapsulated second multicast packet to all user-side ports of the specified multicast tree in a multicast manner when the destination switch unique identification address of the second multicast packet is the unique identification address of the root of the specified multicast tree of the first switch.

6. The method according to claim 4, wherein the network side is connected to a Transparent Interconnection of Lots of Links (TRILL) network.

7. The method according to claim 4, wherein determining whether the destination switch unique identification address of the first multicast packet is the unique identification address of the root of the specified multicast tree of the first switch comprises:

acquiring a multicast group identifier of the first multicast packet according to a tenant identifier of the first multicast packet;

searching, according to the multicast group identifier and the destination switch unique identification address of the first multicast packet, a specified forwarding table preset in the first switch;

determining that the destination switch unique identification address of the first multicast packet is the unique identification address of the root of the specified multicast tree of the first switch when an entry comprising the multicast group identifier and the destination switch unique identification address of the first multicast packet is found; and determining that the destination switch unique identification address of the first multicast packet is not the unique identification address of the root of the specified multicast tree of the first switch when an entry comprising the multicast group identifier and the destination switch unique identification address of the first multicast packet is not found.

8. The method according to claim 5, wherein determining whether the destination switch unique identification address of the first multicast packet is the unique identification address of the root of the specified multicast tree of the first switch comprises:

acquiring a multicast group identifier of the first multicast packet according to a tenant identifier of the first multicast packet;

searching, according to the multicast group identifier and the destination switch unique identification address of the first multicast packet, a specified forwarding table preset in the first switch;

determining that the destination switch unique identification address of the first multicast packet is the unique identification address of the root of the specified multicast tree of the first switch when an entry comprising the multicast group identifier and the destination switch unique identification address of the first multicast packet is found; and determining that the destination switch unique identification address of the first multicast packet is not the unique identification address of the root of the specified multicast tree of the first switch when an entry comprising the multicast group identifier and the destination switch unique identification address of the first multicast packet is not found.

9. A switch, wherein the switch comprises:
a receiver;
a processor; and
a transmitter,
wherein the switch is a first switch,
wherein the receiver is configured to receive a multicast packet from a first customer edge or a second customer edge,
wherein the first customer edge is connected to the first switch in a single-homed manner,
wherein the second customer edge is connected to N switches in an all-active manner,
wherein the N switches comprise the first switch,
wherein N is greater than or equal to 2,
wherein the processor is configured to determine a specified multicast tree of the first switch,
wherein the specified multicast tree is specified in advance from N generated multicast trees in a network,
wherein the N switches respectively belong to the N different specified multicast trees,
wherein the N switches encapsulate the multicast packet to obtain an encapsulated multicast packet,
wherein a destination switch unique identification address in a header of the encapsulated multicast packet is a unique identification address of a root of the specified multicast tree, determined by the processor, of the first switch, and
wherein the transmitter is configured to forward the encapsulated multicast packet to a network side using the specified multicast tree of the first switch.

10. The switch according to claim 9, wherein the network side is connected to a Transparent Interconnection of Lots of Links (TRILL) network, and wherein the unique identification address of the root of the specified multicast tree is a nickname of the root.

11. The switch according to claim 9, wherein the processor is configured to determine the specified multicast tree of the first switch according to a multicast group identifier carried in the multicast packet and a specified forwarding table preset in the first switch, wherein an entry of the specified forwarding table comprises the multicast group identifier and an identifier of the specified multicast tree, wherein the transmitter is configured to forward the encapsulated multicast packet to the network side using a multicast tree that is obtained by pruning the specified multicast tree of the first switch according to a tenant identifier, wherein the tenant identifier is determined according to the multicast group identifier, and wherein the encapsulated multicast packet further comprises the tenant identifier.

12. A switch, wherein the switch comprises:
a receiver;
a processor; and
a transmitter,
wherein the switch is a first switch,
wherein the receiver is configured to receive a first multicast packet from a network side,
wherein the processor is configured to:
decapsulate the first multicast packet to obtain a destination switch unique identification address of the first multicast packet from a header of the first multicast packet after the receiver receives the first multicast packet from the network side; and determine whether the destination switch unique identification address of the first multicast packet decapsulated by the processor is a unique identification address of a root of a specified multicast tree of the first switch, wherein the transmitter is configured to send the decapsulated first multicast packet to only a single-homed port of all user-side ports of the multicast group in a multicast manner when the destination switch unique identification address of the first multicast packet is not the unique identification address of the root of the specified multicast tree of the first switch, wherein all the user-side ports comprise at least one single-homed port and at least one multi-homed port, wherein a customer edge that is connected to the at least one multi-homed port is connected to N switches in an all-active manner, wherein the N switches comprise the first switch, wherein the specified multicast tree of the first switch is specified in advance from N generated multicast trees in a network, wherein the N switches respectively belong to the N different specified multicast trees, and wherein N is greater than or equal to 2.

13. The switch according to claim 12, wherein the receiver is further configured to receive a second multicast packet from the network side, wherein the second multicast packet and the first multicast packet belong to a same multicast group, wherein the processor is further configured to:

decapsulate the second multicast packet to obtain a destination switch unique identification address of the second multicast packet from a header of the second multicast packet after the receiver receives the second multicast packet from the network side; and determine whether the destination switch unique identification address of the second multicast packet decapsulated by the processor is the unique identification address of the root of the specified multicast tree of the first switch, and wherein the transmitter is further configured to: send the decapsulated second multicast packet to all user-side ports of the specified multicast tree in a multicast manner when the destination switch unique identification address of the second multicast packet is the unique identification address of the root of the specified multicast tree of the first switch.

14. The switch according to claim 12, wherein the network side is connected to a Transparent Interconnection of Lots of Links (TRILL) network.

15. The switch according to claim 12, wherein the processor is further configured to:

acquire a multicast group identifier of the first multicast packet according to a tenant identifier of the first multicast packet;

search, according to the multicast group identifier of the first multicast packet and the destination switch unique identification address, a specified forwarding table preset in the first switch;

determine that the destination switch unique identification address of the first multicast packet is the unique identification address of the root of the specified multicast tree of the first switch when the processor finds an entry comprising the multicast group identifier and the destination switch unique identification address of the first multicast packet; and determine that the destination switch unique identification address of the first multicast packet is not the unique identification address of the root of the specified multicast tree of the first switch when the processor does not find an entry comprising the multicast group identifier and the destination switch unique identification address of the first multicast packet.

16. The switch according to claim 13, wherein the processor is further configured to:

acquire a multicast group identifier of the first multicast packet according to a tenant identifier of the first multicast packet;

search, according to the multicast group identifier of the first multicast packet and the destination switch unique identification address, a specified forwarding table preset in the first switch;

determine that the destination switch unique identification address of the first multicast packet is the unique identification address of the root of the specified multicast tree of the first switch when the processor finds an entry comprising the multicast group identifier and the destination switch unique identification address of the first multicast packet; and determine that the destination switch unique identification address of the first multicast packet is not the unique identification address of the root of the specified multicast tree of the first switch when the processor does not find an entry comprising the multicast group identifier and the destination switch unique identification address of the first multicast packet.

* * * * *